United States Patent Office 3,465,778
Patented Sept. 9, 1969

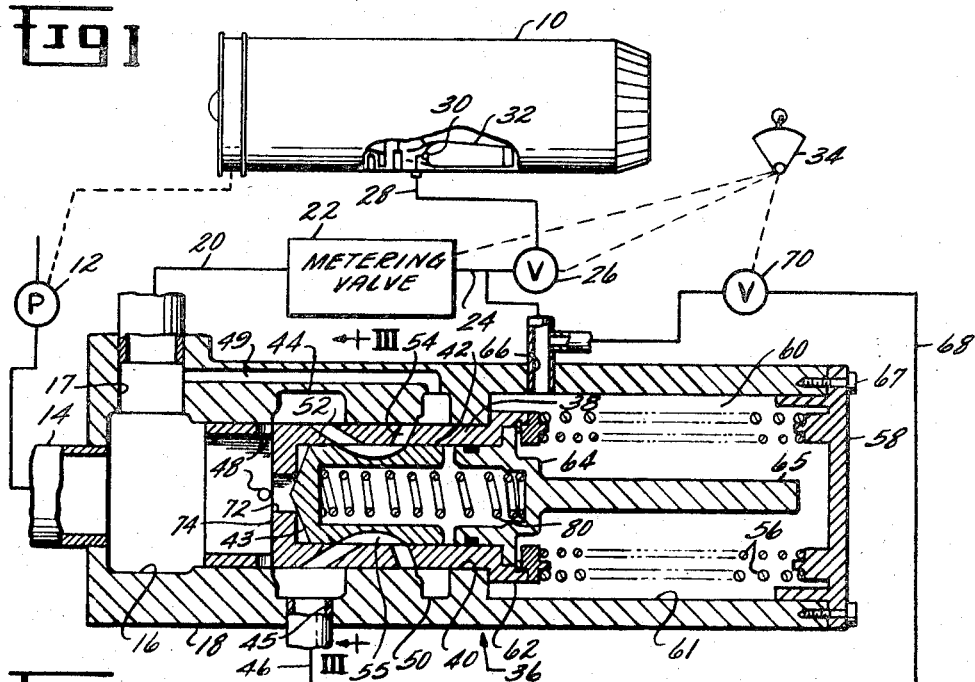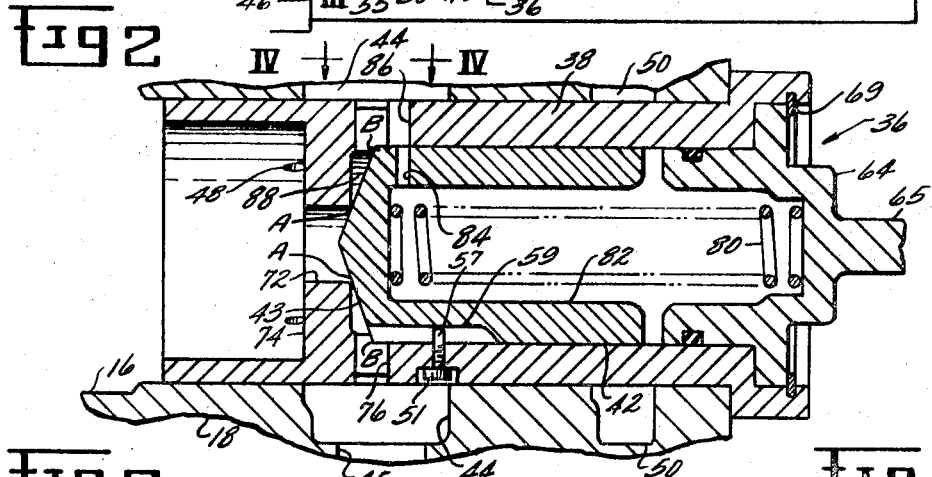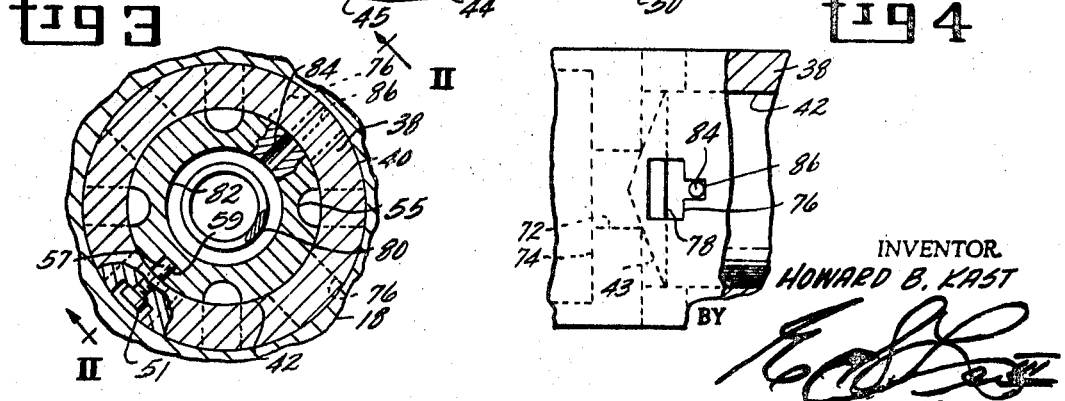

3,465,778
COMBINED PRESSURE CONTROL VALVE AND PRESSURE RELIEF VALVE HAVING A FLAT PRESSURE-FLOW CHARACTERISTIC
Howard B. Kast, Fairfield, Ohio, assignor to General Electric Company, a corporation of New York
Filed Aug. 8, 1966, Ser. No. 571,069
Int. Cl. F15b 5/00
U.S. Cl. 137—117           9 Claims

ABSTRACT OF THE DISCLOSURE

A compact combined pressure control and pressure relief valve is disclosed in which the pressure relief piston is contained within a differential pressure regulating piston. The valve includes means for balancing dynamic flow forces on the regulating piston. The pressure relief valve series flow path comprises a primary orifice, a continuously variable area secondary discharge orifice, and a pressure chamber intermediate the said orifices which structure provides a flat pressure-flow characteristic. Additionally a continuously variable area damping orifice is provided to stabilize operation of the relief valve piston.

---

The present invention relates to an improved pressure control valve.

Many fluid flow systems require pressure control valves that accurately regulate or limit pressures over a wide range of operating conditions. An example of such a system is the fuel control system for a gas turbine engine where maintenance of accurate pressures is necessary for optimum engine performance. However, in the past, valves that were capable of accurate functioning over diverse conditions were very complex and bulky. Furthermore, the weight of these valves added to the overall engine weight.

Accordingly, it is an object of the present invention to provide a simple, compact, lightweight pressure control valve for accurate functioning over a broad range of operating conditions.

These ends are achieved according to one aspect of the invention by providing a multipurpose pressure control valve for use with a pressurized fluid flow system, said pressure control valve comprising a housing, having an inlet exposed to said fluid system at one point and an outlet to a low pressure discharge. Passageway means are provided for interconnecting the inlet to the outlet.

A sleeve valve element is displaceable in the passageway means and is adapted to be displaced by the pressure in the inlet to form in cooperation with the passageway means a first flow path to the outlet. Means are provided for yieldably urging the sleeve valve element to a position wherein flow to the outlet is blocked.

A piston valve element is displaceable in the interior of the sleeve valve element and is adapted to be displaced by the pressure in the inlet to form in cooperation with the sleeve valve element a second flow path to the outlet. Means are provided for yieldably urging the piston valve element to a position wherein flow to the outlet is blocked.

Means are provided for directing a fluid pressure from another point in the liquid flow system to one of the valve elements so that the pressure acts in combination with the yieldable urging means to urge the valve element to a closed position whereby the valve element regulates the pressure in the inlet at a predetermined level above the pressure at the other point in the liquid flow system. The other of the yieldable urging means is adapted to urge the other valve element into a closed position with a pressure that is greater than the pressures exerted on the pressure regulating valve element, whereby the other valve element limits the maximum pressure in the liquid flow system.

Preferably, the multipurpose control valve is used with a fluid flow system comprising a liquid flow path to a discharge point. A metering valve is disposed in the flow path for scheduling flow of fluid to the discharge point. A cutoff valve is disposed in the flow path downstream of the metering valve for blocking flow to the discharge point when the system is in an off condition. The inlet of the pressure control valve is exposed to the fluid flow path upstream of the metering valve and the pressure directing means is adapted to direct a pressure from the fluid flow system at a point between the metering valve and the cutoff valve.

Means are provided for selectively connecting the pressure-directing means to the low pressure discharge when the cutoff valve blocks flow to the discharge point so that the pressure control valve maintains the pressure in the inlet a predetermined level above the low pressure discharge. The pressure of the inlet, therefore, is minimized when the cutoff valve blocks flow to the discharge point.

In another aspect of the invention the stated ends are achieved by providing a relief valve for limiting the maximum pressure in a fluid system. The valve comprises a relief orifice, one side of which is exposed to the fluid system and a valve element. Means are provided for yieldingly urging the valve element into sealing engagement with the opposite side of the relief orifice whereby the valve element is displaced away from the inlet to cause fluid flow therethrough when the fluid system pressure is above a predetermined level. A chamber pressurized by fluid flow through the relief orifice and defined in part by the sealing portion of the valve is provided. Discharge orifice means are provided which vary in area as a function of valve element displacement and maintaining the pressure drops across the discharge orifice means and relief orifice at a combined total sufficient to maintain a substantially constant maximum pressure in the fluid system irrespective of the flow volume through the relief orifice.

The above and other related objects and features of the invention will be apparent from a reading of the following description of the disclosure found in the accompanying drawing and the novelty thereof pointed out in the appended claims.

In the drawing:

FIGURE 1 is a longitudinal section of a pressure control valve embodying the features of the present invention together with a simplified showing of the cooperating elements of a gas turbine engine fuel control system.

FIGURE 2 is a fragmentary, longitudinal section of the pressure control valve in FIGURE 1, taken on line II—II of FIGURE 3.

FIGURE 3 is a fragmentary cross section view taken on line III—III of FIGURE 1.

FIGURE 4 is a view taken on line IV—IV of FIGURE 2.

FIGURE 1 shows a simplified fuel control system for a gas turbine engine 10 in which the present invention is utilized. An engine driven fuel pump 12 draws fuel from a fuel tank (not shown) and pressurizes it for delivery through a conduit 14 to a chamber 16 in the housing 18 of a multipurpose valve 36, later described. Fuel in chamber 16 is discharged through a passageway 17 and a conduit 20 to a metering valve 22 controlled by an operator lever 34. The fuel then flows through a conduit 24 to a main cutoff valve 26 and through a conduit 28 to a series of nozzles 30 in an engine combustor 32.

The cutoff valve 26 may be switched to an open position by moving the operator-controlled lever 34 from an off position to a start or idle position. Further movement of the lever 34 causes the metering valve 22 to schedule fuel to the nozzles 30 at a rate in proportion to the position of the lever 34. This control input may also be modified by certain engine operating parameters, if desired.

The multipurpose valve 36 comprises an outer valve sleeve 38 slidable in a bore 40 extending from chamber 16 and a valve piston 42 slidable in the interior of the valve sleeve 38. A common annular discharge chamber 44, formed in the bore 40, connects with a low pressure discharge conduit 46.

When valve sleeve 38 is displaced to an open position, a series of ports 48, normally blocked by the walls of bore 40, are opened to provide a direct flow path from chamber 16 to discharge chamber 44. A second flow path to the low pressure discharge chamber 44 is provided when the valve sleeve 38 is opened. This second path extends from the high pressure passageway 17 through a passageway 49, into an annular chamber 50. From chamber 50 the flow path extends through a series of ports 52, 54 within sleeve 38 and connecting grooves 55 found in piston 42 to the discharge chamber 44. A screw 51, mounted in the sleeve 38, has a dog 57 which extends into a groove 59 of the piston 42 to restrain piston 42 from relative rotation and keep ports 52, 54 and grooves 55 in line, as shown in FIGURE 3.

A double spring 56 disposed in a bore 61 acts against an end cap 58, fastened to housing 18 by screws 67, to yieldingly urge the valve sleeve 38 to the closed position illustrated in FIGURE 1, wherein flow through the above flow paths is blocked. A shoulder 62 on the sleeve 38 limits its travel to the closed position and an end cap 64 retained in the sleeve 38 by a snap ring 69 has a stop 65 which serves to limit its travel to the open position.

The housing 18, the end cap 58, and the sleeve end cap 64 cooperate to form a chamber 60 which is connected to conduit 24 by a conduit 66.

Reference is now had to FIGURE 2 which shows in detail valve piston 42. A port 72 in a partition member 74 of the sleeve 38 provides a flow path from the chamber 16 to the interior of the valve sleeve 38 whenever the piston 42 is displaced to an open position. A series of rectangular ports 76 provide a flow path from the interior of sleeve 38 to the discharge chamber 44. An edge 78 of a conical end portion 43 of piston 42 cooperates with the rectangular ports 76 to form a series of variable orifices, as shown in FIGURE 4, the area of which is dependent upon the displacement of the piston 42.

A spring 80 acts against the cap 64 and the bottom wall of a recess 82 in the piston 42 to yieldingly urge the piston 42 against the port 72 and block flow therethrough. A port 84 connects the interior of the piston 42 with the common discharge chamber 44. One of the rectangular ports 76 has a notch 86, the edge of which acts to gradually restrict the port 84 as the piston 42 is displaced to an open position.

The multipurpose valve 36 is adapted to control the output pressure of the pump 12 in a manner now to be described.

When the engine 10 is operating, the pressure output of the pump 12 acts in a direction to open the sleeve valve 38 against the action of the spring 56 and the pressure force in chamber 60. The pressure in chamber 16 also urges the piston 42 to an open position. The spring 80 is selected so that the opening pressure for the piston 42 is above that for the sleeve 38. During normal operation of the valve 38, described below, the piston 42 remains in its closed position, preventing flow through port 72.

Whenever the opening force exerted by the pressurized fuel in chamber 16 exceeds the closing forces exerted by the spring 56 and the pressurized fuel in chamber 60, the sleeve 38 is displaced to allow flow of fuel through ports 48 to the low pressure discharge chamber 44. At the same time fuel flows from chamber 50 through ports 52, 54 and connecting grooves 55 to chamber 44.

It is apparent then, that the fuel is bypassed to the low pressure discharge conduit 46 to regulate the pressure differential across the metering valve 22.

As the fuel passes from the ports 48, the flow path into the discharge chamber 44 angles slightly to the right due to the momentum of the fuel. The fuel discharged from ports 48 at this angle has a momentum force component which acts along the axis of the sleeve 38 towards the right. A reaction force equal and opposite to this axial component of the momentum force is exerted on the sleeve 38 towards the left, or in a closing direction. This reaction force in the closed direction acts to increase the amount of force necessary to move the sleeve 38 into an open position. During conditions of high bypass flow this closing force would cause a substantial increase in the force of the pressurized fuel in chamber 16 necessary to open the sleeve valve 38.

To counteract the closing force, the momentum of the fuel passing through ports 54, 52 and grooves 55 is changed so that it exerts an equal opening force on the sleeve 38. In this connection it should be noted the direction of the fuel entering the grooves 55 is greater than its direction change as it leaves the grooves. It is apparent that the change in direction of the fuel as it passes into the grooves 55 causes a reaction force to its momentum change to be exerted on the sleeve 38 and piston 42 in an open direction. Similarly, the change in direction as the fuel enters the ports 52 causes a reaction force to its momentum change to be exerted on the sleeve 38 and piston 42 in a closing direction.

The shape of the grooves 55 and the angle of the ports 52, 54 are selected so that the resultant reaction force due to these changes in momentum is in an opening direction and equal to the previously mentioned closing force. The sleeve 38, therefore, is able to accurately maintain the pressure in chamber 16 a predetermined level above the pressure in conduit 24 during conditions of high bypass flow. As such, the pressure differential across the metering valve 22 is maintained constant, enabling it to accurately schedule fuel to the engine 10 over a broad range of flow rates.

If for some reason the sleeve 38 sticks in a closed position, or the nozzles 30 become clogged, the pressure in chamber 16 could build up to such a level that the life of the pump 12 would be reduced. To limit the maximum output pressure of the pump 12, the piston valve 42 performs a relief valve function in the following fashion.

As previously stated, the high pressure in chamber 16 acts to urge piston 42 to an open position. This opening pressure exerts a force which acts over an area A defined by the port 72. This force is opposed by the force of the spring 80. In addition, the low pressure in the chamber 44 acts over an annular area B of the exposed head portion 43 to open the valve 42. This low pressure force is opposed by the same pressure as in chamber 44 acting over the opposite end of the piston 42. These forces cause a resultant relatively low closing force on the piston 42. The low pressure causing these forces generally remains substantially constant so that the pressure at which the piston is displaced to an open position remains constant.

When pressure in chamber 16 increases to a level where the closing force of the spring 80 and the low pressure closing force is exceeded, the piston 42 is displaced from the port 72 and the fuel flows into chamber 88, defined by the conical head 43 of piston 42 and the interior of the sleeve 38. When the chamber 88 is full, fuel discharges through the variable area orifices to the chamber 44. The variable area orifices offer a restriction to flow which increases the pressure in chamber 88 above the level in chamber 44. This pressure acts over the annular area B of the head portion 43 and adds to the opening force of the pressure in chamber 16.

Under conditions of high fuel flow to the chamber 44, a number of forces act on the piston 42 and have a resultant causing the pressure in the chamber 16 to increase substantially above the pressure required for the initial opening displacement of the piston 42.

One of these forces is the change in momentum of the fuel leaving port 72 as it is diverted by the conical head portion 43 of the piston 42. This change in momentum causes a resultant force in the opening direction. Another force is a closing force, similar to the force previously described, caused by the discharge of fuel from the variable area orifices along a flow path angled to the right. In addition, the spring 80 acts in a direction to close the piston with a force that increases with increasing displacement of the piston 42 from its closed position.

The force produced by the momentum change of the fuel, the closing force on the piston 42, and the spring force add to give a resultant force which acts in the closing direction and increases with an increase in displacement of the piston 42.

An additional force that acts in an open direction to oppose the resultant closing force is caused by the previously mentioned pressure increase in chamber 88, caused by the restriction of the varibale area orifices. As the flow to the chamber 44 increases, the force caused by the pressure in chamber 88 increases. However, the pressure in chamber 88 does not increase at the same rate at which the pressure in a chamber with a fixed orifice would because the area of the variable orifices increases as the piston 42 moves to a more open position.

The ports 76 are shaped so that the area of the variable orifices increase with piston displacement at such a rate that the pressure in the chamber 88 exerts an opening force over area B that equals the rate of increase of the foremetioned resultant closing force. The net effect is that a constant force is exerted on the piston 42 in a closing direction over the full range of piston travel. As such, the pressure in chamber 16 required to displace piston 42 towards an open position remains constant over flow ranges from zero to very high levels.

The particular shape of the ports 76 will depend somewhat upon the physical dimensions of the combination valve 36, but it has been found that a rectangular port having an area ratio of 2 to 1 from a closed to a fully open position of piston 42 results in a constant pressure in chamber 16 for a broad range of flow rates.

It is highly desirable that the area of the variable area orifice increases at such a rate that the increase in the total closing force is equaled. If the area of the orifices increases at too great a rate with piston displacement, the total closing force would increase with increasing flow, thus requiring an increase in the output pressure of pump 12.

By maintaining a constant pressure in chamber 16, the load on the pump 12 is minimized when excess pressure in the fuel control system is being relieved by the piston 42. Furthermore, by maintaining the output pressure of the pump 12 at this level, the pump 12 is immediately ready to supply fuel to the nozzles 30 when the excess pressure condition is remedied.

Another important feature in the operation of piston valve 42 in performing a pressure relief function is found in its stable action, now to be described. As the piston 42 is displaced to an open position in response to increasing fuel flow to the chamber 44, the port 84 is covered up, thus trapping fuel in the interior of piston 42. This restriction of flow through the port 84 serves to damp the velocity of the piston in an open direction and insure stable action. Furthermore, when the pressure in chamber 16 is reduced and the piston 42 moves to the closed position, the increased pressure in chamber 88, caused by the restriction of the variable area orifices, causes a force which damps the velocity of the piston in a closing direction.

The multipurpose valve 36 performs an additional function during operation of the fuel control system. When the lever 34 is retracted to a closed position upon engine shutdown, the gas turbine engine 10 gradually slows down and continues to drive the pump 12 for a period of time. During this condition the pressure in conduit 24, and hence chamber 16, would build up a relatively high level. To prevent this occurrence a conduit 68 having a lever-operated, normally closed valve 70 extends from conduit 24 to the low pressure discharge conduit 46. Movement of lever 34 to the off position opens the valve 70 which lowers the pressure in conduit 24 to the relatively low level of the discharge conduit 46. As a result, the pressure in chamber 16 is maintained at a moderate level which reduces the load on the pump 12.

The invention thus described provides an extremely compact and reliable multipurpose pressure control valve which functions as a pressure regulating, safety valve and a pump unloading valve. While the pressure control valve has been described as being incorporated in a fuel control system, it is apparent that it may be used with equal advantage in any fluid flow system. For example, the relief valve piston 42, while cooperating with the sleeve valve member 38 to form a pressure control valve, embodies features that may be used in any fluid system to provide a highly accurate positive limit on system pressures.

Other modifications of the described embodiment may be made by those skilled in the art without departing from the spirit of the invention.

Having thus described the invention, what is claimed as novel and desired to be secured by Letters Patent of the United States is:

1. A multipurpose pressure control valve for use with a pressurized fluid flow system, said pressure control valve comprising:
   a housing having an inlet exposed to said fluid system at one point and an outlet to a low pressure discharge,
   passageway means interconnecting said inlet and said outlet,
   a sleeve valve element displaceable in said passageway means,
   said sleeve valve element being adapted to be displaced by the pressure in said inlet to form in cooperation with said passageway means a first flow path to the outlet,
   means for yieldably urging said sleeve valve element to a position wherein flow to said outlet is blocked,
   a piston valve element displaceable in the interior of said sleeve valve element,
   said piston valve element being adapted to be displaced by the pressure in said inlet to form in cooperation with said sleeve valve element a second flow path to said outlet,
   means for yieldably urging said piston valve element to a position wherein flow to said outlet is blocked,
   means for directing a fluid pressure from another point in said fluid flow system to one of said valve elements so that said pressure acts in combination with the yieldable urging means to urge said valve element to a closed position whereby said valve element regulates the pressure in said inlet at a predetermined level above the pressure at said other point in the fluid flow system,
   the other yieldable urging means being adapted to urge the other valve element into a closed position with a pressure that is greater than the pressures exerted on said pressure-regulating valve element,
   whereby said other valve element limits the maximum pressure in said fluid flow system.

2. A multipurpose pressure control valve as in claim 1 wherein said fluid flow system comprises:
   a fluid flow path to a discharge point,
   a metering valve disposed in said flow path for scheduling flow of fluid to said discharge point,
   a cutoff valve disposed in said flow path downstream of said metering valve for blocking flow to said discharge point when said system is in an off condition,
   the inlet of said pressure control valve is exposed to the fluid flow path upstream of said metering valve, said pressure directing means is adapted to direct a pressure from the fluid flow system at a point between said metering valve and said cutoff valve, means for selectively connecting said pressure directing means to said low pressure discharge when said cutoff valve blocks flow to said discharge point such that said pressure control valve maintains the pressure in said inlet a predetermined level above said low pressure discharge, whereby the pressure of said inlet is minimized when said cutoff valve blocks fluid flow to said discharge point.

3. A multipurpose pressure control valve as in claim 1 wherein:

said sleeve valve element is displaceable in an axial direction and has a radial passageway therethrough for cooperating with said interconnecting passageway means to form said flow path to said outlet, said pressure control valve further comprises a second passageway means interconnecting said inlet with said outlet, said sleeve valve element has a second passageway therethrough such that said second passageway cooperates with said second interconnecting passageway means to form another flow path to said outlet when said sleeve valve element is displaced by the pressure in said inlet, said second passageway being adapted to provide a flow path whereby the momentum of the fluid flowing therethrough is changed to cause a resultant reaction force acting in a direction to open said sleeve valve element, which equals the closing reaction force exerted on said valve by fluid discharged through said radial ports, and said sleeve valve element is adapted to regulate the pressure in said fluid system, whereby said sleeve valve element accurately regulates the pressure in said inlet when the fluid flow in said passageways is relatively large.

4. A multipurpose valve as in claim 3 wherein:

said sleeve valve element further comprises an internally disposed partition member having a relief orifice therein with one side thereof exposed to said inlet, said piston valve element being displaceable into sealing engagement with said relief orifice by said yieldable urging means, said piston valve element being displaceable away from said relief orifice by the pressure in said inlet to provide a chamber into which fluid from said inlet flows, said sleeve valve element having an orifice for interconnecting said chamber with said outlet, said orifice cooperating with said piston valve element to form a variable area discharge orifice varying in area as a function of piston valve element displacement and maintaining the pressure drops across said discharge orifice and said relief orifice at a combined total sufficient to maintain a substantially constant maximum pressure in said fluid system irrespective of the flow volume through said relief orifice.

5. A multipurpose valve as in claim 4 wherein:

the orifice in said sleeve which cooperates with said piston to form said variable area discharge orifice is rectangular, said sleeve valve element has a cap at one end for providing a damping chamber in which said yieldable urging means acts on said piston valve element, said piston valve element has a passageway for interconnecting said damping chamber with said outlet, and said sleeve valve element has a port therethrough for cooperating with said piston passageway to form a variable area restriction therein as said piston valve element is displaced by the fluid pressure in said inlet, whereby fluid is retained in said damping chamber to damp the motion of said piston valve element towards an open position.

6. A multipurpose pressure control valve as in claim 5 wherein:

said sleeve valve element has a pair of ports therethrough, said piston valve element has a groove therein for interconnecting said ports, one of said ports being open to said outlet and the other of said ports cooperating with said second interconnecting passageway means to form said second flow path from said inlet to said outlet when said sleeve valve element is displaced by the pressure in said inlet.

7. A relief valve for limiting the maximum pressure in a fluid system, said valve comprising:

a relief orifice, one side of which is exposed to the fluid system, a valve element, means for yieldingly urging said valve element into sealing engagement with the opposite side of said relief orifice whereby said valve element is displaced away from said inlet to cause fluid flow therethrough when said fluid system pressure is above a predetermined level, a chamber pressurized by fluid flow through said relief orifice and defined, in part, by the sealing portion of said valve, discharge orifice means continuously varying in area as a function of valve element displacement and maintaining the pressure drops across said discharge orifice means and relief orifice at a combined total sufficient to maintain a substantially constant maximum pressure in said fluid system irrespective of the flow volume through said relief valve, a damping chamber in which said yieldable urging means acts to displace said valve element into sealing engagement with said relief orifice, a discharge chamber into which the fluid from said discharge orifice flows, said valve element having a damping orifice open to said discharge chamber and to said damping chamber, said damping orifice cooperating with an edge of said discharge orifice to form a variable area damping restriction whose area continuously decreases as said valve element is displaced by the fluid pressure at said relief orifice.

8. A relief valve as in claim 7 wherein said discharge orifice means comprise:

a rectangular orifice in said chamber, said rectangular orifice cooperating with said valve element to form the variable area discharge orifice.

9. A relief valve as in claim 8 wherein:

said variable area discharge orifice formed by said rectangular orifice and said valve element has an area ratio of two to one from a closed to a fully open position of said valve element.

References Cited

UNITED STATES PATENTS

| 867,702 | 10/1907 | Clarke | 137—514.5 |
| 1,029,464 | 6/1912 | Ruwell | 137—540 XR |
| 1,754,975 | 4/1930 | Anderson | 137—514.5 |
| 2,665,704 | 1/1954 | Kanuch | 137—110 |
| 2,980,132 | 4/1961 | Prijatel et al. | |
| 3,027,913 | 4/1962 | Chatham et al. | 137—514.5 XR |
| 3,199,532 | 8/1965 | Trick | 137—469 |

ROBERT G. NILSON, Primary Examiner

U.S. Cl. X.R.

137—469, 514.5